United States Patent
Holbein et al.

(10) Patent No.: US 12,221,060 B2
(45) Date of Patent: Feb. 11, 2025

(54) BELT RETRACTOR DEVICE FOR A MOTOR VEHICLE

(71) Applicant: ZF AUTOMOTIVE GERMANY GMBH, Alfdorf (DE)

(72) Inventors: Wolfgang Holbein, Alfdorf (DE); Balakoteswararo Guggilam, Alfdorf (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 383 days.

(21) Appl. No.: 17/615,842

(22) PCT Filed: May 27, 2020

(86) PCT No.: PCT/EP2020/064644
§ 371 (c)(1),
(2) Date: Dec. 2, 2021

(87) PCT Pub. No.: WO2020/244982
PCT Pub. Date: Dec. 10, 2020

(65) Prior Publication Data
US 2022/0314926 A1     Oct. 6, 2022

(30) Foreign Application Priority Data
Jun. 4, 2019 (DE) .......................... 102019114926.6

(51) Int. Cl.
*B60R 22/44* (2006.01)
*B60R 22/34* (2006.01)

(52) U.S. Cl.
CPC ...... *B60R 22/44* (2013.01); *B60R 2022/3402* (2013.01); *B60R 2022/4473* (2013.01)

(58) Field of Classification Search
CPC ........ B60R 2022/3402; B60R 2022/44; B60R 2022/4473; B60R 2022/4666; B60R 22/46; B60R 2022/3427; B60R 2022/1818
(Continued)

(56) References Cited

U.S. PATENT DOCUMENTS 5,205,025 A * 4/1993 Kielwein .............. B60R 22/405
29/469

FOREIGN PATENT DOCUMENTS

DE         19902805 A1    8/1999
DE      102006012937 A1   9/2007
(Continued)

OTHER PUBLICATIONS

PCT International Search Report for corresponding International Application Serial No. PCT/EP2020/064644, mailed Jul. 3, 2020, pp. 1-4.

Primary Examiner — Sang K Kim
(74) Attorney, Agent, or Firm — Tarolli, Sundheim, Covell & Tummino LLP (57) ABSTRACT

A belt retractor device for a vehicle comprises a first device component (12), a second device component (14) and a detent mechanism (16) including a first detent element (26) and a second detent element (28). The first detent element (26) has at least two stops (58) which are offset from each other in the radial direction and in the axial direction relative to a mounting axis (20). The second detent element (28) includes a detent edge (40) configured to engage in one of the stops (58) of the first detent element (12) and to prevent the first device component (12) and the second device component (14) from moving relative to each other against the mounting direction of the mounting axis (20).

20 Claims, 5 Drawing Sheets

(58) Field of Classification Search
USPC .............................................. 242/379, 379.2
See application file for complete search history.

(56) References Cited

FOREIGN PATENT DOCUMENTS

| | | |
|---|---|---|
| DE | 102012019808 A1 | 3/2013 |
| DE | 102016223355 A1 | 8/2017 |
| DE | 102016117965 A1 | 3/2018 |
| WO | 2018/054779 A1 | 3/2018 |

* cited by examiner

BELT RETRACTOR DEVICE FOR A MOTOR VEHICLE

RELATED APPLICATIONS

This application is a U.S. National Stage Application filed under 35 USC 371 claiming priority to Serial No. PCT/EP2020/064644, filed on 27 May 2020; which claims priority from German Patent Application DE 10 2019 114 926.6, filed 4 Jun. 2019, the entireties of which are hereby incorporated herein by reference.

TECHNICAL FIELD

The invention relates to a belt retractor device for a vehicle.

BACKGROUND

Belt retractor devices are typically used for seatbelts in vehicles to adapt the length of the seatbelt to the vehicle occupant. Modern belt retractor devices include additional device components such as a belt tensioner, a gear unit and/or an electronic control unit which must be fastened to the belt retractor device.

It is known from prior art to fasten said device components on the belt retractor device using screws and/or rivets. Hence, additional tools are required to fasten the attachments to the belt retractor device.

SUMMARY

Therefore, it is the object of the invention to provide a belt retractor device for a vehicle that enables easy mounting of the device components.

For achieving this object, according to the invention a belt retractor device for a vehicle is provided comprising a first device component, a second device component and a detent mechanism which has a first detent element and a second detent element, wherein the first device component and the second device component are movable toward each other in a mounting direction along a mounting axis, wherein the first detent element includes at least two stops offset from each other relative to the mounting axis in the radial direction and in the axial direction, and wherein the second detent element includes a detent edge configured to engage in one of the stops of the first detent element and to prevent the first device component and the second device component from moving relative to each other against the mounting direction of the mounting axis.

The invention is based on the fundamental idea of the first device component and the second device component being adapted to be fastened to each other using the detent mechanism, i.e., the first detent element and the second detent element. For this purpose, the first detent element includes two stops in which the detent edge of the second detent element engages. The two stops provide for an adjustable detent connection between the first device component and the second device component. Accordingly, the detent mechanism provides a clip-stop connection which enables easy mounting of device components of a belt retractor device.

The designation of axial, radial and circumferential directional indications in the foregoing and hereinafter relates to the mounting axis, unless otherwise explicitly specified.

For example, the disassembling force is many times higher, in particular by 5 to 20 times, preferably by 10 times higher, than the assembling force. The disassembling force is the force required to detach the first and second device components from each other without using any further tools. In this way, there is provided a detent mechanism that permits easy mounting and tightly connects the two device components.

In other words, the force required to move the first and second device components relative to each other against the mounting direction is many times higher, in particular 5 to 20 times, preferably 10 times higher, than the force required to move the first and second device components relative to each other in the mounting direction.

The detent mechanism may be formed partly on the first device component and partly on the second device component.

In one configuration of the invention, the play of the two device components relative to each other can be adapted by the stops, thus causing manufacturing tolerances to be compensated. This allows for easy positioning of the device components relative to each other.

An action of force in the mounting direction may provide the play between the device components to be reduced. In this way, simple adjustment of the play is possible.

In order to allow precise positioning of the two device components relative to each other, more than two stops may be provided.

In one configuration of the invention, the axial stops are configured to be stepped. This helps further improve the capability of positioning the two device components relative to each other.

In particular, the axial spaces of the stops from each other are equal so that very precise positioning is made possible.

In one configuration of the invention, the first detent element is provided on the first device component or on the second device component, and the second detent element is provided on the respective other of the first device component or the second device component. This enables a modular structure of the belt retractor device.

Generally, there may also be provided plural first and/or second detent elements on the first and/or second device component. Accordingly, the detent mechanism helps provide a simple fastening means by which the device components can be connected to each other quickly and without using any tools.

In one embodiment of the invention, the first device component or the second device component is a gear unit of the belt retractor device, particularly wherein the second device component or the first device component is an electronic control unit of the belt retractor device. The detent mechanism helps facilitate the positioning of the electric contacts of the gear unit and the control unit.

In order to fix the relative positioning of the first and second device components, the belt retractor device may include a locking device that is configured to prevent the first and second device components from rotating relative to each other.

For example, the locking device includes a fixing pin and a holder for the fixing pin.

Equally, there may be holes arranged concentrically to each other in the first and second device components, the holes being fixed relative to each other by a fixing pin or a screw.

The second detent element may include a center part and an elastic tongue which is tightly connected, at one of its ends, to the center part, wherein the detent edge is formed at the other end of the tongue. This represents an especially simple configuration of the second detent element.

For example, the tongue extends both in the radial direction and in the axial direction. The tongue thus can absorb especially high forces which counteract the mounting direction.

For providing an inexpensive second detent element, the elastic tongue and the center part may be formed integrally, for example as a plastic injection-molded part.

A stable detent mechanism can be realized, for example, by a tongue which is biased radially outwardly.

In one configuration of the invention, the first detent element is rigid and includes a base and at least one outer portion substantially extending in the axial direction from the base. This enables the first detent element to be designed in a stable manner.

The first detent element may circumferentially enclose the second detent element, thus allowing a reliable detent connection to be made between the first and second detent elements.

For example, the first detent element is substantially U-shaped and has a second outer portion also extending in the axial direction from the base.

In order to provide an inexpensive detent mechanism, the outer portion may include a radially inwardly projecting extension on which the at least two stops are formed.

The at least two stops may be formed on the side of the radially inwardly projecting extension that faces the base. In this way, it is possible to design the detent mechanism without any intermediate member.

The extension may be provided to be arranged at a free end of the outer portion and thus at an end of the outer portion which does not contact any other component of the belt retractor device.

A guide element may be formed on the radially inwardly projecting extension. Thus, easy mounting is facilitated.

The guide element is formed, for example, on the side remote from the base.

In one configuration of the invention, the guide element is a guide surface and/or a guide edge.

In order to provide a compact detent mechanism, the guide element can apply the elastic tongue inwardly in the radial direction when attaching the first device component to the second device component.

The elastic tongue may be provided to contact only the guide element or one of the stops. This means that the elastic tongue will never simultaneously contact the guide element and one of the stops.

According to one embodiment of the invention, in the base a hole is provided which is at least partially aligned in the axial direction with the extension, in particular with at least one of the stops. In this way, it is possible to check the relative positioning of the first detent element and the second detent element from outside.

For example, the hole is arranged radially between the outer portion and the second detent element.

In one configuration of the invention, the hole is configured to receive an unlocking device for detaching the first detent element from the second detent element to move the tongue radially inwardly so that the device components are movable against the mounting direction. This facilitates easy disassembly of the device components as well as easy adjustment of the position of the device components relative to each other.

In order to enable proper handling of the unlocking device, the unlocking device may be rod-shaped.

BRIEF DESCRIPTION OF THE DRAWINGS

Further features and advantages of the invention will be evident from the following description of two embodiments of a belt retractor device according to the invention as well as from the attached drawings which will be referred to in the following, and wherein.

DESCRIPTION

Figure 1:
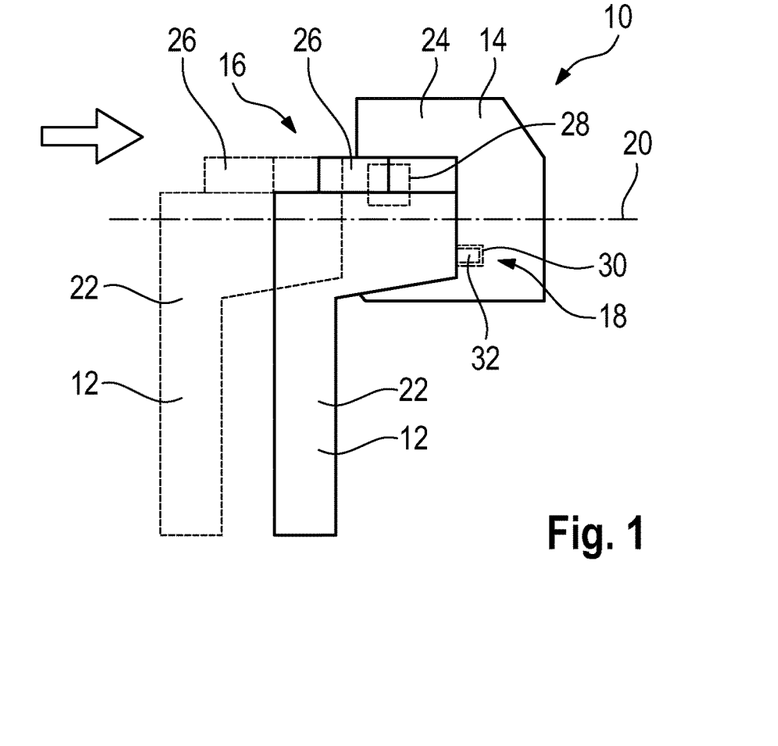
FIG. 1 shows a lateral view of a belt retractor device according to the invention in a first embodiment.
Figure 2:
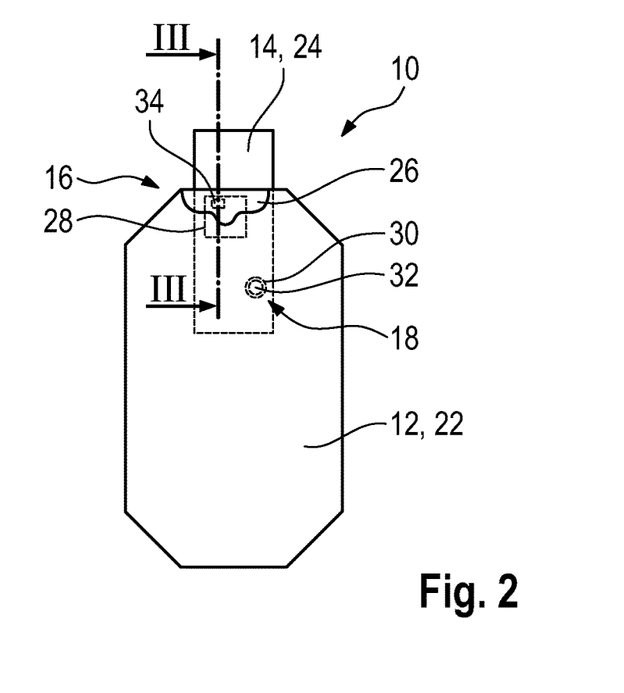
FIG. 2 shows a front view of the belt retractor device from FIG. 1.

In FIGS. 1 and 2, a first embodiment of a belt retractor device 10 for a seatbelt of a vehicle is shown. FIG. 1 illustrates a lateral view of the belt retractor device 10 and FIG. 2 illustrates a front view of the belt retractor device 10.

The belt retractor device 10 comprises a first device component 12, a second device component 14, a detent mechanism 16 and a locking device 18.

The first device component 12 and the second device component 14 are movable relative to each other along a mounting axis 20 in a mounting direction shown by an arrow.

The movability is shown in FIG. 1 by the two positions of the first device component 12. In the first position, shown by a continuous line, the first device component 12 and the second device component 14 are in the mounted state, and in the second position, shown by a broken line, the device components 12, 14 are in the disassembled state.

In the embodiment of the belt retractor device 10 shown in FIG. 1, the first device component 12 is a gear unit 22 and the second device component 14 is an electronic control unit 24.

The detent mechanism 16 comprises a first detent element 26 and a second detent element 28.

In FIG. 1, the first detent element 26 is arranged on the first device component 12 and the second detent element 28 is arranged on the second device component 14.

The detent mechanism 16 is configured to prevent the first device component 12 and the second device component 14 from moving relative to each other against the mounting direction along the mounting axis 20. The functioning shall be illustrated in detail later by way of FIG. 3.

Accordingly, the first device component 12 can be moved from the second position to the first position, viz. in the mounting direction, but not against the mounting direction.

The locking device 18 includes a holder 30 and a fixing pin 32. The holder 30 is provided at the second device component 14 and the fixing pin 32 is provided at the first device component 12.

The fixing pin 32 is configured to positively engage, in the mounted state of the belt retractor device 10, in the holder 30 and to prevent the first device component 12 from rotating relative to the second device component 14.

For example, the holder 30 is a blind hole and the fixing pin 32 is a rod which is formed complementarily thereto and fits positively in the blind hole.

FIG. 2 illustrates that a hole 34 is provided in the first detent element 26.

Figure 3:
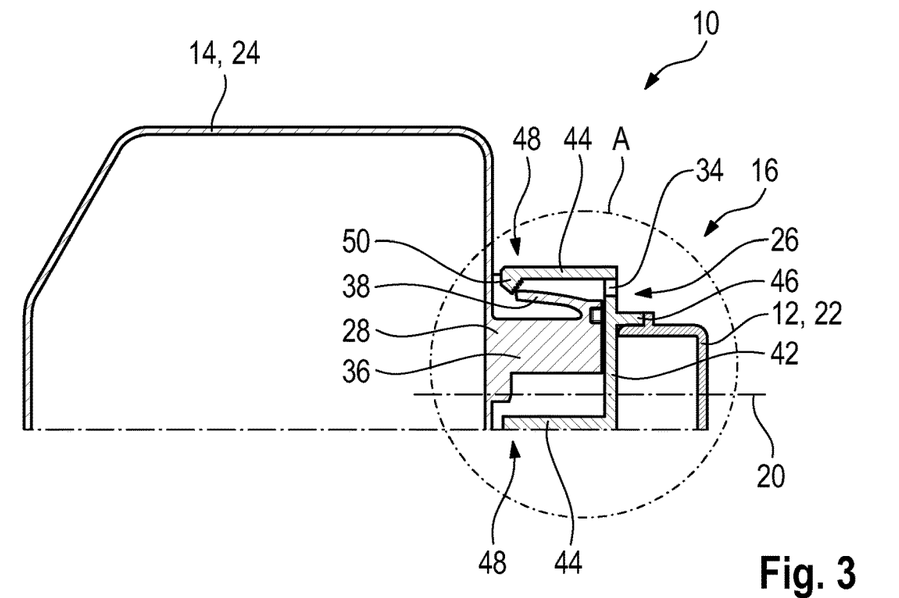
FIG. 3 shows a longitudinal section across the belt retractor device of FIG. 2 along the section line III-III.

The detent mechanism 16 is shown in FIG. 3. FIG. 3 illustrates a longitudinal section across the belt retractor device along the line III-III of FIG. 2.

The second detent element 28 has a center part 36 and an elastic tongue 38. The center part 36 extends primarily in the axial direction and is connected to the second device component 14 at one axial end. At the other axial end, the center part 36 is adjacent to the first detent element 26.

Generally, it is also imaginable that the entire second detent element 28 is elastic.

The second detent element 28 is permanently connected to the second device component 14, for example, or is formed integrally with the second device component 14.

Figure 4:
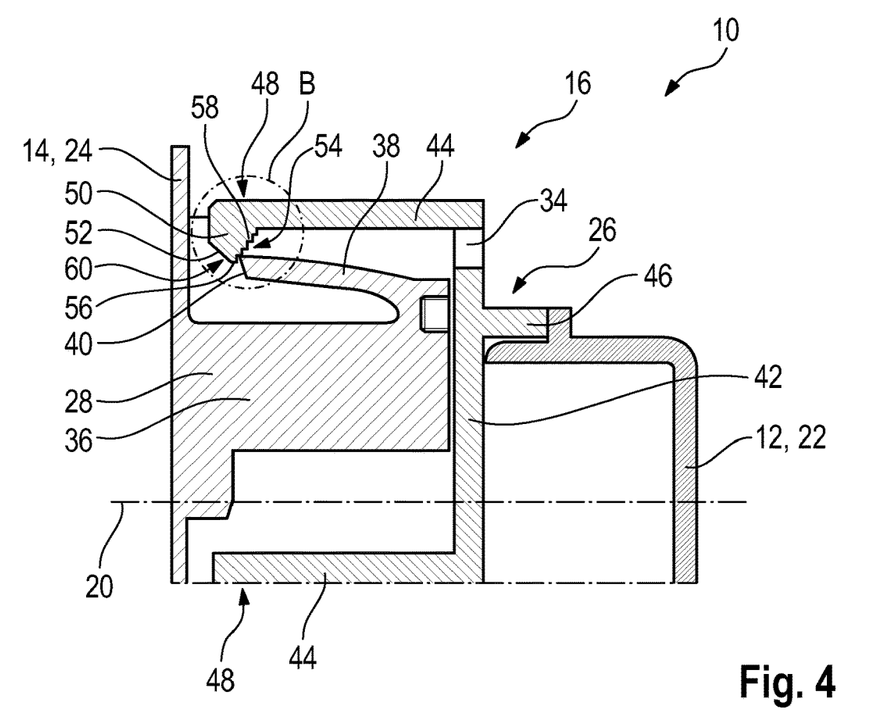
FIGS. 4 and 6 show the detent mechanism of FIG. 1 in a longitudinal section across the detail A of FIG. 3 in different positions of the second detent element.

The elastic tongue 38 extends from an axial end of the center part 36 in the mounting direction, as is visible in FIG. 4.

The elastic tongue 38 includes a detent edge 40 substantially disposed in the radial direction which is disposed at the end of the elastic tongue 38 that is not connected to the center part 36.

The elastic tongue 38 may be tensioned radially inwardly and extends both in the radial direction and in the axial direction.

Also, it is imaginable that the elastic tongue 38 is formed integrally with the center part 36.

The first detent element 26 is rigid and includes a base 42 and two outer portions 44.

The base 42 extends substantially in the radial direction and has an axial connecting portion 46. The base 42, viz. the first detent element 26, is fastened to the first device component 12 by means of the connecting portion 46.

The outer portions 44 extend from the base 42 at its periphery axially in the mounting direction. Hence, in the longitudinal section of FIG. 3, the first detent element 26 is substantially U-shaped.

More precisely, the outer portions 44 extend from the base 42 in the mounting direction toward the second device component 14. Thus, the outer portions 44 are arranged between the base 42 and the second device component 14.

The base 42 also includes the hole 34 of the first detent element 26. FIG. 4 illustrates that the hole 34 is disposed between the outer portion 44 and the center part 36 of the second detent element 28.

The outer portions 44 do not contact the second device component 14, however, so that they have a free end 48.

A radially inwardly projecting extension 50 is provided at the free end 48 of an outer portion 44 of the first detent element 26.

The radially inwardly projecting extension 50 includes a guide surface 52 and a stop side 54 which are arranged axially opposed to each other and are separated from each other by a guide edge 56.

The guide surface 52 faces the first device component 12 and the stop side 54 faces the base 42.

The guide surface 52 and the guide edge 56 form a guide element 60 of the first detent element 26. The guide element 60 is formed on the side of the radially inwardly projecting extension 50 remote from the base 42 and, during mounting, acts upon the elastic tongue 38 of the second detent element 28 in the radial direction.

Figure 5:
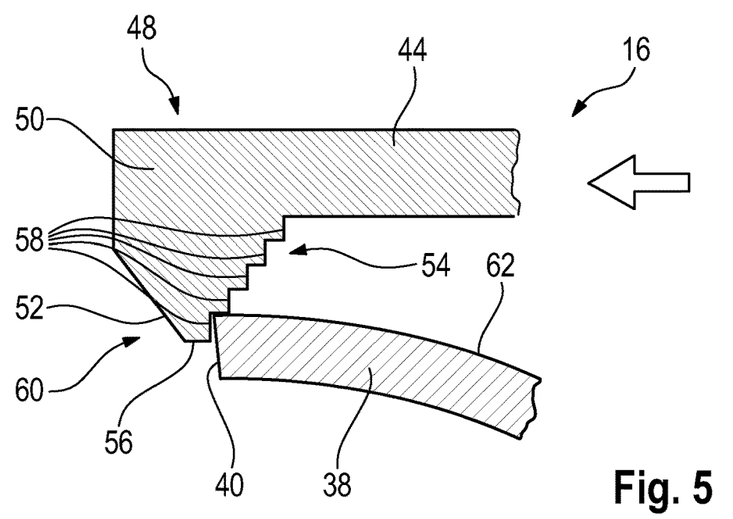
FIG. 5 shows a longitudinal section across the detail B of FIG. 4.

FIG. 5 illustrates that the stop side 54 forms a stop for the elastic tongue 38 of the second detent element 28. For this purpose, on the stop side 54 plural stops 58 are provided which are offset from each other in the radial direction and in the axial direction with respect to the mounting axis 20, and thus are stepped.

The stops 58 extend substantially in the radial direction based on the mounting axis 20.

Figure 6:
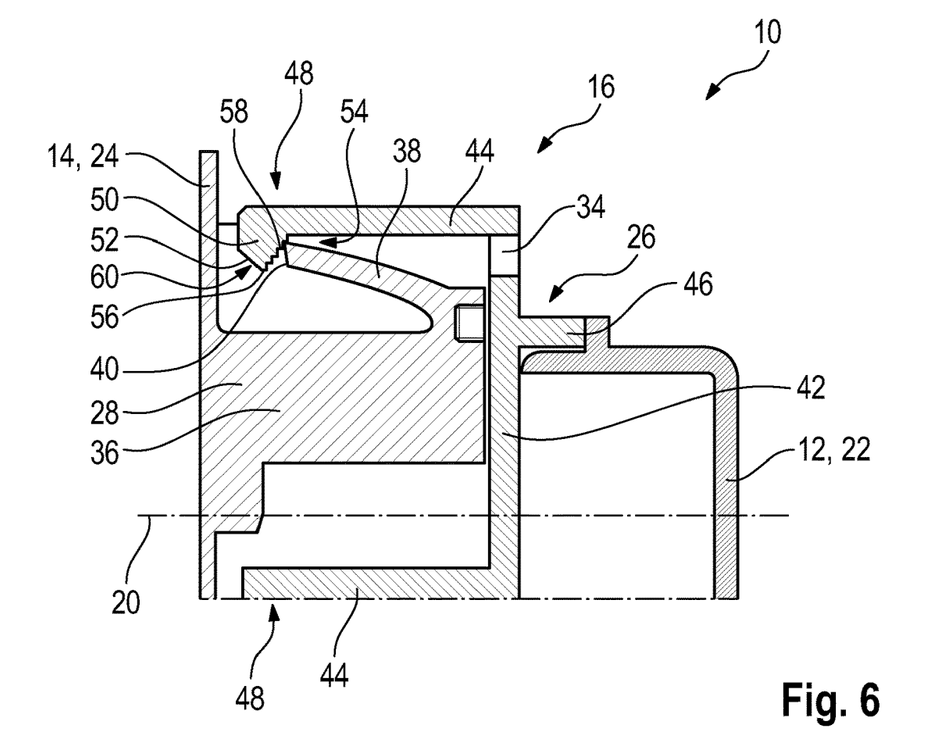

In the mounting positions of the belt retractor device 10 shown in FIGS. 4 and 6, the elastic tongue 38 of the second detent element 28 engages, against the mounting direction, in one of the stops 58 of the radially inwardly projecting extension 50 of the first detent element 26 by means of the detent edge 40.

Accordingly, the first detent element 26 cannot be moved against the mounting direction relative to the second detent element 28 so that also a movement of the first device component 12 and the second device component 14 relative to each other against the mounting direction is prevented by the detent mechanism 16.

A force acting on the first device component 12 and, resp., the first detent element 26 in the mounting direction, i.e., in FIG. 5 a force to the left, results in the stops 58 moving relative to the detent edge 40. Because of the tension of the elastic tongue 38, the detent edge 40 of the second detent element 28 is moved into a stop 58 which is located radially further outside. As the stops 58 located radially further outside also have a smaller distance from the base 42 of the first detent element 26, the selection of a stop 58 helps adjust the positioning of the first detent element 26 relative to the second detent element 28.

This situation is illustrated in FIG. 6. The elastic tongue 38 is arranged further outside and the detent edge 40 engages in a stop 58 located radially further outside.

Thus, in FIG. 6 the play between the first device component 12 and the second device component 14 is smaller than in FIG. 4.

Accordingly, the play between the first device component 12 and the second device component 14 can be adjusted by the detent mechanism 16.

The bias of the elastic tongue 38 required to this end is produced during mounting. During mounting, the guide element 60 acts upon the side 62 of the elastic tongue 38 remote from the center part 36 and forces said side inwardly in the radial direction. Thus, the elastic tongue 38 of the second detent element 28 is forced inwardly, and the first detent element 26 can be slid onto the second detent element 28 in the mounting direction.

As soon as the guide edge 56 is no longer in contact with the side 62, the elastic tongue 38 is forced radially outwardly by its bias and the detent edge 40 engages in one of the stops 58.

Consequently, the elastic tongue 38 only contacts the guide element 60 or one of the stops 58, but never both of them at the same time.

Figure 7:
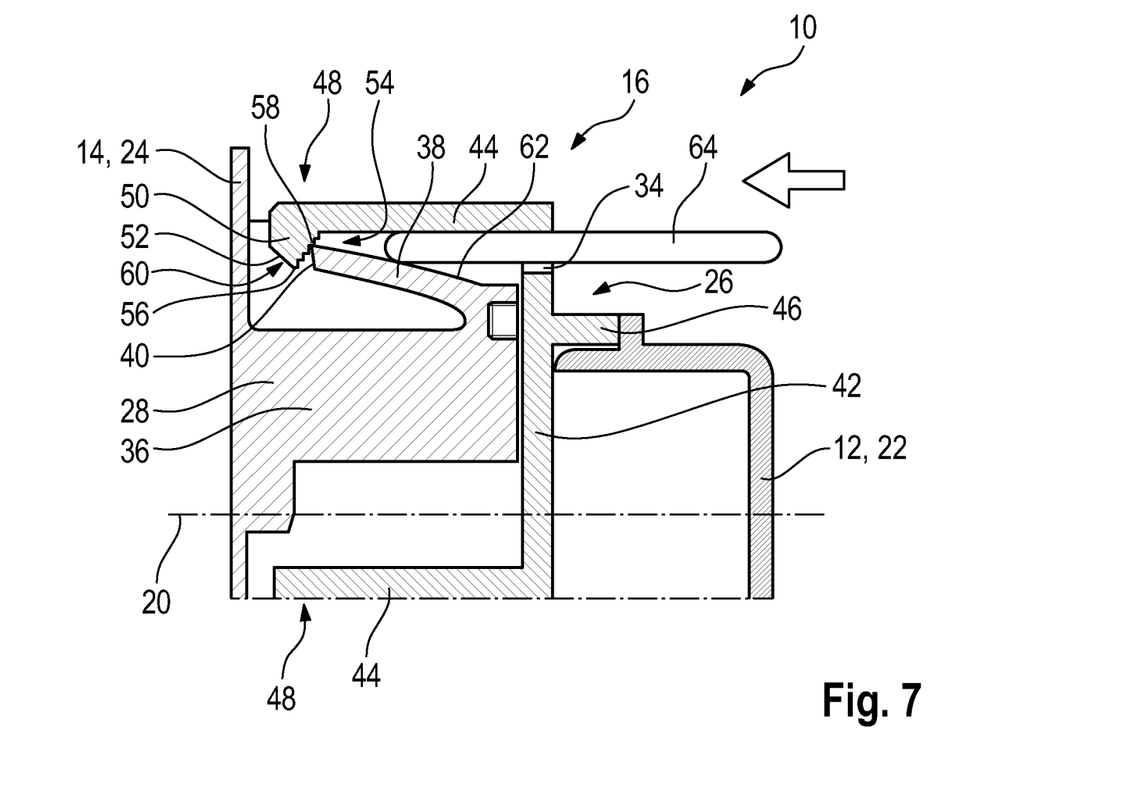
FIG. 7 shows a longitudinal section across the detail A of FIG. 3 with an unlocking device.

FIG. 7 shows the detail A of FIG. 3 in a longitudinal section and illustrates the release of the detent connection between the first detent element 26 and the second detent element 28.

To this end, an unlocking device 64 is used that is configured to be inserted into the hole 34 of the first detent element 26.

In the embodiment shown in FIG. 7, the unlocking device 64 is rod-shaped and the hole 34 is disposed so that the radially outer end of the hole 34 is at least partially aligned with the radially inwardly projecting extension 50.

In particular, the radially outer end of the hole 34 is aligned with the radially outermost stop 58 and, thus, also with the side of the outer portion 44 facing the elastic tongue 38.

The radially inner end of the hole 34 is disposed, when viewed in the radial direction, closer to the mounting axis 20 than the guide edge 56 of the guide element 60.

The insertion of the unlocking device 64 into the hole 34 causes the elastic tongue to be moved radially inwardly. As soon as the side 62 of the elastic tongue 38 is located radially further inside than the guide element 60, the first detent element 26 and, thus, the first device component 12 can be moved against the mounting direction. Thus, the first device component 12 can be detached from the second device component 14.

This means in the shown embodiment that the gear unit 22 can be detached from the electronic control unit 24 using the unlocking device 64.

The embodiment of the belt retractor device 10 illustrated in FIGS. 3 to 7 includes a total of five stops 58, as shown in FIG. 5. Generally, only two stops 58 are required to be able to adjust the play between the first device component 12 and the second device component 14.

However, the play between the first device component 12 and the second device component 14 can be adjusted more precisely if there is a larger number of stops 58.

Moreover, the relative rotation between the first device component 12 and the second device component 14 is prevented by the fixing pin 32 and the holder 30.

Figure 8:
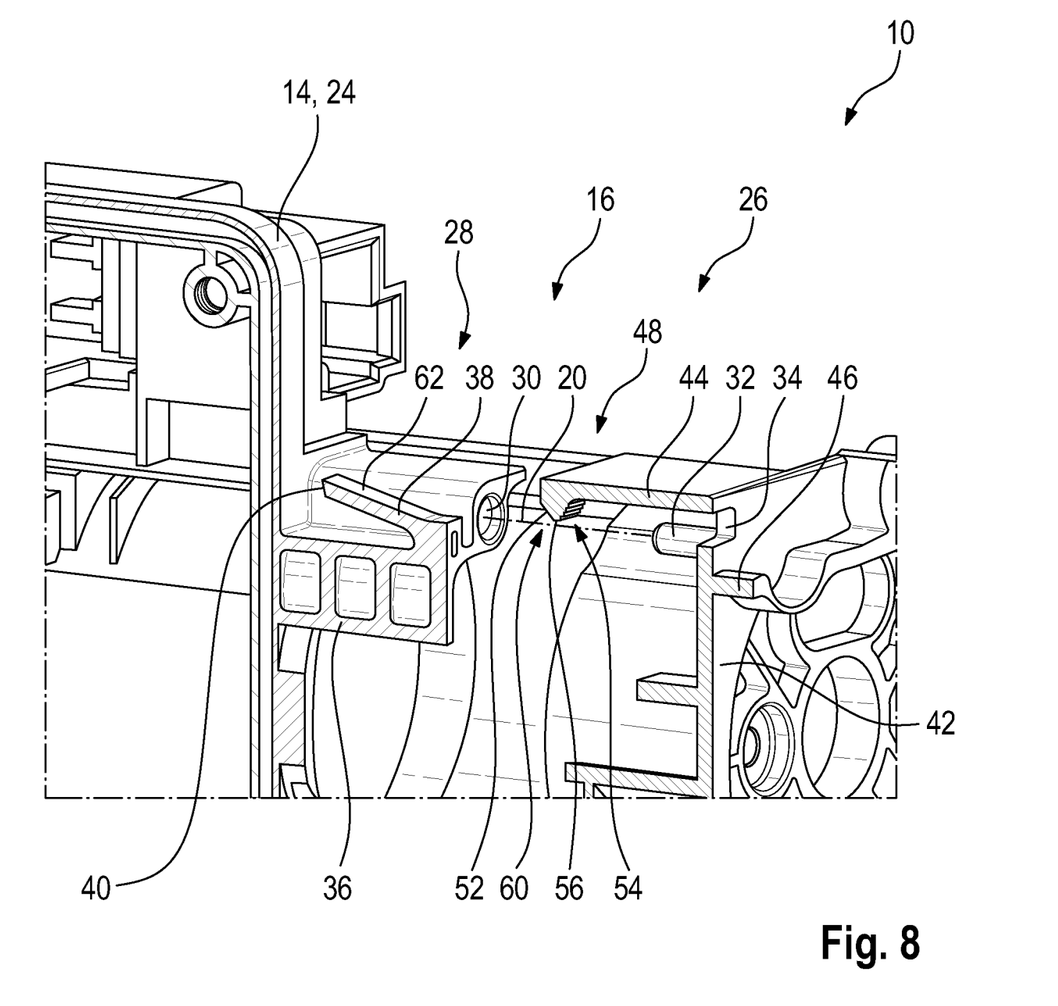
FIG. 8 shows a perspective longitudinal section across a belt retractor device according to the invention in a second embodiment.

FIG. 8 illustrates a second embodiment of the belt retractor device 10 which substantially corresponds to the first embodiment. Therefore, hereinafter only the differences shall be discussed. Equal and equally functioning components show the same reference numerals.

Unlike the first embodiment, in FIG. 8 an alternative arrangement of the fixing pin 32 and the holder 30 is shown.

In this arrangement, the fixing pin 32 is offset from the opening 34 perpendicularly to the mounting axis 20 on the first device component 12. The fixing pin 32 is adjacent to the at least one outer portion 44.

In other words, the fixing pin 32 and the holder 30 may be arranged at a similar height to the detent mechanism 16.

Moreover, in FIG. 8 the first device component 12 is not shown for reasons of clarity.

Generally, any coupling of the first device component 12 and the second device component 14 to an additional position as the detent mechanism 16 is imaginable.

For example, both in the first device component 12 and in the second device component 14 a concentric hole may be provided into which a fixing pin or a screw is introduced.

It is further conceivable to make use of the opening 34 for fixing the first device component 12 and the second device component 14 to each other using a screw.

The invention claimed is:

1. A belt retractor device for a vehicle, comprising a first device component (12), a second device component (14) and a detent mechanism (16) including a first detent element (26) and a second detent element (28),
    wherein the first device component (12) and the second device component (14) are movable toward each other along a mounting axis (20) in a mounting direction,
    wherein the first detent element (26) is rigid and includes a base (42) and an outer portion (44) that extends substantially in the axial direction from the base (42), the outer portion (44) including a radially inwardly projecting extension (50) on which a plurality of stops (58) are formed on a side of the extension (50) that faces the base (42), each stop (58) being offset from each of the other stops (58) relative to the mounting axis (20) in the radial direction and in the axial direction, and
    wherein the second detent element (28) includes an elastic tongue (38) having a detent edge (40), the detent edge (40) being configured to engage in one of the stops (58) of the first detent element (26) and to prevent the first device component (12) and the second device component (14) from moving relative to each other against the mounting direction of the mounting axis (20), an entire axial length of the elastic tongue (38) being located in the axial direction between the base (42) and the extension (50) when the detent edge (40) engages in one of the stops (58).

2. The belt retractor device according to claim 1, wherein the axial stops (58) are stepped.

3. The belt retractor device according to claim 1, wherein the first detent element (26) is provided on the first device component (12) or on the second device component (14), and in that the second detent element (28) is provided on the respective other of the first device component (12) or the second device component (14).

4. The belt retractor device according to claim 1, wherein one of the first device component (12) and the second device component (14) is a gear unit (22) of the belt retractor device (10) and the other of the first device component (12) and the second device component (14) is an electronic control unit (24) of the belt retractor device (10).

5. The belt retractor device according to claim 1, wherein the belt retractor device (10) includes a locking device (18) configured to prevent the first and second device components (12, 14) from rotating relative to each other.

6. The belt retractor device according to claim 5, wherein the locking device (18) includes a fixing pin (32) and a holder (30) for the fixing pin (32).

7. The belt retractor device according to claim 1, wherein the second detent element (28) includes a center part (36), the elastic tongue (38) being tightly connected to the center part (36) at one of its ends, wherein, at the other end of the tongue (38), the detent edge (40) is formed, and wherein the tongue (38) extends both in the radial direction and in the axial direction.

8. The belt retractor device according to claim 7, wherein the tongue (38) is biased radially outwardly.

9. The belt retractor device according to claim 7, wherein the tongue (38) extends both in the radial direction and in the axial direction from the center part (36).

10. The belt retractor device according to claim 1, wherein a guide element (60) is formed at the extension (50) on the side remote from the base (42).

11. The belt retractor device according to claim 1, wherein in the base (42) a hole (34) is provided which is at least partially aligned in the axial direction with at least one of the stops (58).

12. The belt retractor device according to claim 11, wherein the hole (34) is disposed radially between the outer portion (44) and the second detent element (28).

13. The belt retractor device according to claim 1, wherein each stop is defined by an axially facing first surface and a radially facing second surface that extends axially from the first surface, the first surface of at least one of the stops extending radially from the second surface of a radially adjacent stop.

14. The belt retractor device according to claim 1, wherein the center part (36) extends in the axial direction toward the base, the tongue (38) extending radially and axially from the center part (36) toward the stops (58) such that the tongue (38) extends away from the base (42).

15. The belt retractor device according to claim 14, wherein the first detent element (26) is on the first device component (12) such that the base (42) is adjacent the first device component (12) and the outer portion (44) extends substantially in the axial direction from the base (42) away from the first device component (12), the second detent element (28) being on the second device component (14) such that the center part (36) extends in the axial direction from the second device component (14) toward both the base (42) and the first device component (12).

16. The belt retractor device according to claim 1, wherein the first detent element (26) circumferentially encloses the second detent element (28).

17. A belt retractor device for a vehicle, comprising:
a gear unit (22);
an electronic control unit (24), the electronic control unit (24) and the gear unit (22) being moveable toward each other along a mounting axis (20) in a mounting direction;
a first detent element (26) including a plurality of stops (58), each stop (58) being offset from each of the other stops (58) relative to the mounting axis (20) in the radial direction and in the axial direction;
a second detent element (28) including a detent edge (40) configured to engage in one of the stops (58) of the first detent element (26) and to prevent the gear unit (22) and the electronic control unit (24) from moving relative to each other against the mounting direction of the mounting axis (20), one of the gear unit (22) and the electronic control unit (24) including the first detent element (26) and the other of the gear unit (22) and the electronic control unit (24) including the second detent element (28); and
a locking device (18) configured to prevent the gear unit (22) and the electronic control unit (24) from rotating relative to each other.

18. The belt retractor device according to claim 17, wherein the locking device (18) includes a fixing pin (32) and a holder (30) for the fixing pin (32), one of the gear unit (22) and the electronic control unit (24) including the fixing pin (32) and the other of the gear unit (22) and the electronic control unit (24) including the holder (30).

19. A belt retractor device for a vehicle, comprising a first device component (12), a second device component (14) and a detent mechanism (16) including a first detent element (26) and a second detent element (28),
wherein the first device component (12) and the second device component (14) are movable toward each other along a mounting axis (20) in a mounting direction,
wherein the first detent element (26) includes a cavity in which a plurality of stops (58) are formed, each stop (58) being offset from each of the other stops (58) relative to the mounting axis (20) in the radial direction and in the axial direction, and
wherein the second detent element (28) is insertable in the mounting direction into the cavity so as to be completely circumferentially enclosed by the first detent element (26) when inserted therein, the second detent element (28) including a detent edge (40) configured to engage one of the stops (58) in the cavity of the first detent element (26) to prevent the first device component (12) and the second device component (14) from moving relative to each other against the mounting direction of the mounting axis (20).

20. The belt retractor device according to claim 19, wherein the first detent element (26) includes a base (42) and two outer portions (44) extending substantially in the axial direction from the base (42), the base (42) and the outer portions (44) defining the cavity, only one of the outer portions (44) including a radially inwardly projecting extension (50) on which the plurality of stops (58) are formed on a side of the extension (50) that faces the base (42).

\* \* \* \* \*